United States Patent
Tass et al.

(10) Patent No.: US 12,453,860 B2
(45) Date of Patent: Oct. 28, 2025

(54) EFFECTIVE INVASIVE MULTICHANNEL DESYNCHRONIZING STIMULATION

(71) Applicant: The Board of Trustees of the Leland Stanford Junior University, Stanford, CA (US)

(72) Inventors: Peter Tass, Stanford, CA (US); Justus Alfred Kromer, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 17/253,988

(22) PCT Filed: Jun. 21, 2019

(86) PCT No.: PCT/US2019/038545
§ 371 (c)(1),
(2) Date: Dec. 18, 2020

(87) PCT Pub. No.: WO2019/246561
PCT Pub. Date: Dec. 26, 2019

(65) Prior Publication Data
US 2021/0268289 A1  Sep. 2, 2021

Related U.S. Application Data

(60) Provisional application No. 62/688,962, filed on Jun. 22, 2018.

(51) Int. Cl.
*A61N 1/36* (2006.01)
*A61N 1/05* (2006.01)

(52) U.S. Cl.
CPC ....... *A61N 1/36178* (2013.01); *A61N 1/0531* (2013.01); *A61N 1/0534* (2013.01);
(Continued)

(58) Field of Classification Search
None
See application file for complete search history.

(56) References Cited

U.S. PATENT DOCUMENTS 7,894,904 B2   2/2011   Cowan et al.
8,116,874 B2   2/2012   Tass
(Continued)

FOREIGN PATENT DOCUMENTS

DE   10 2012 002 436 A1   8/2013
WO   WO-2013055940 A2 *  4/2013  ........... A61N 1/0534

OTHER PUBLICATIONS

Google search of "stochastic" definition from Oxford Languages (https://www.google.com/search?q=stochastic&oq=stochastic&aqs=edge..69i57j69i59j0i433i512j0i13l1433i512j0i433i512j69i59j0i131433i51212j69i60.5309j0j9&sourceid=chrome&ie=UTF-8) (Year: 2022).*

(Continued)

*Primary Examiner* — William J Levicky
(74) *Attorney, Agent, or Firm* — Foley & Lardner LLP

(57) ABSTRACT

An apparatus for treatment of a patient using multichannel desynchronizing stimulation includes: (1) n stimulation contacts, with n being 2 or greater; (2) a signal generator connected to the n stimulation contacts; and (3) a controller connected to the signal generator to direct operation of the signal generator, wherein the controller is configured to direct the signal generator to apply a sequence of stimuli through the n stimulation contacts, such that inter-stimulation times in the sequence are time-varying, and successive stimuli in the sequence are non-overlapping in time.

18 Claims, 12 Drawing Sheets

(52) U.S. Cl.
CPC ....... *A61N 1/0551* (2013.01); *A61N 1/36064* (2013.01); *A61N 1/36067* (2013.01)

(56) References Cited

U.S. PATENT DOCUMENTS

| | | | |
|---|---|---|---|
| 8,401,655 B2 | 3/2013 | De Ridder | |
| 2003/0114899 A1* | 6/2003 | Woods ................. | A61N 1/3787 607/43 |
| 2011/0201977 A1* | 8/2011 | Tass ................... | A61H 23/0236 607/3 |
| 2015/0297444 A1* | 10/2015 | Tass ....................... | A61B 5/245 607/96 |
| 2016/0346546 A1* | 12/2016 | Zhu .................... | A61N 1/36071 |
| 2016/0361546 A1* | 12/2016 | Salam ................. | A61B 5/4094 |

OTHER PUBLICATIONS

The free dictionary "stochastic" (https://medical-dictionary.thefreedictionary.com/stochastic) (Year: 2022).*

Hunter, John Lecture Notes on Applied Mathematics Methods and Models; Jun. 17, 2009 https://www.math.ucdavis.edu/~hunter/m280_09/ch.pdf (Year: 2009).*

International Preliminary Report on Patentability on PCT PCT/US2019/038545 dated Dec. 30, 2020.

International Search Report and Written Opinion issued in PCT Application No. PCT/US2019/038545 DTD Oct. 10, 2019, 11 pages.

European Supplementary Search Report on EP Appl. Ser. No. 19823410.6 dated Feb. 4, 2022 (6 pages).

* cited by examiner

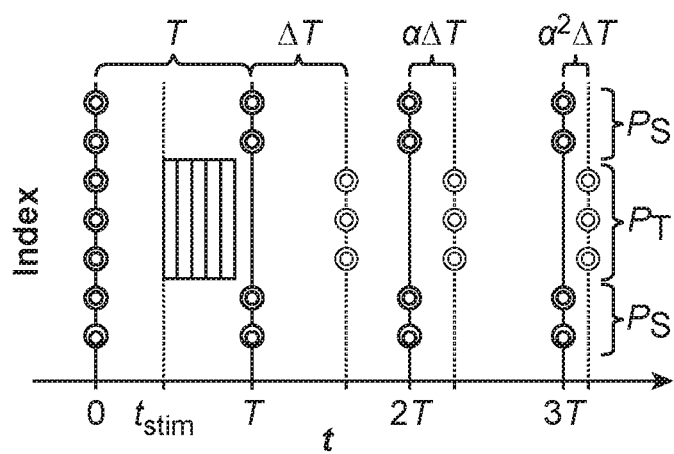
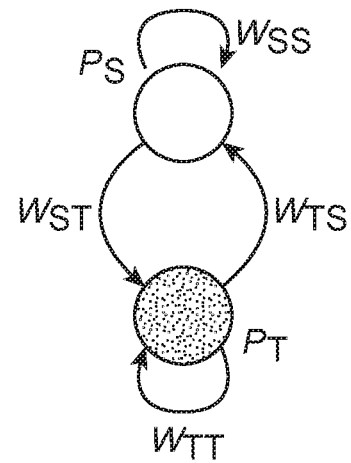
FIG. 3A  FIG. 3B
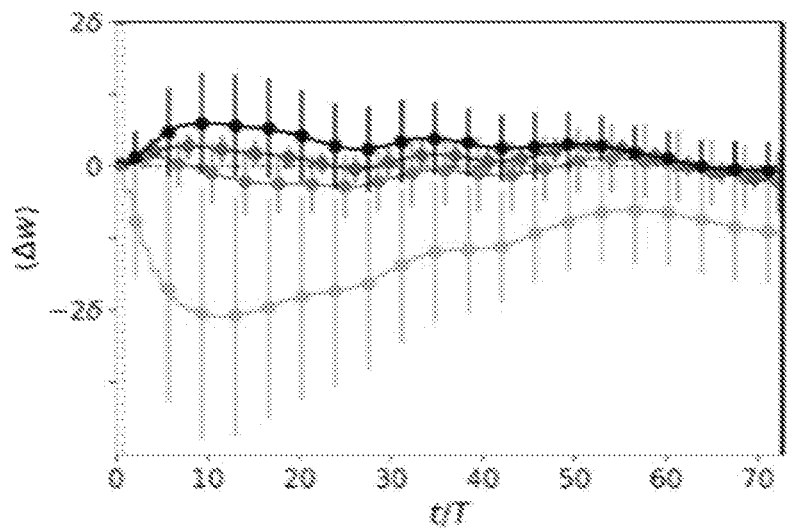
FIG. 3C

1) Stimulated subpopulations are phase-shifted against synch. state
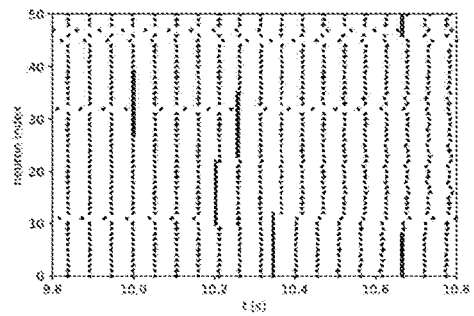
2) During relaxation process synaptic plasticity leads on average to a decrease of synaptic weights
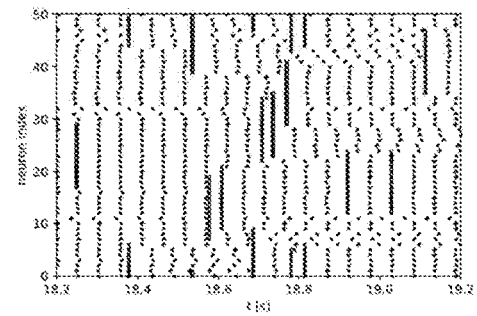
FIG. 6

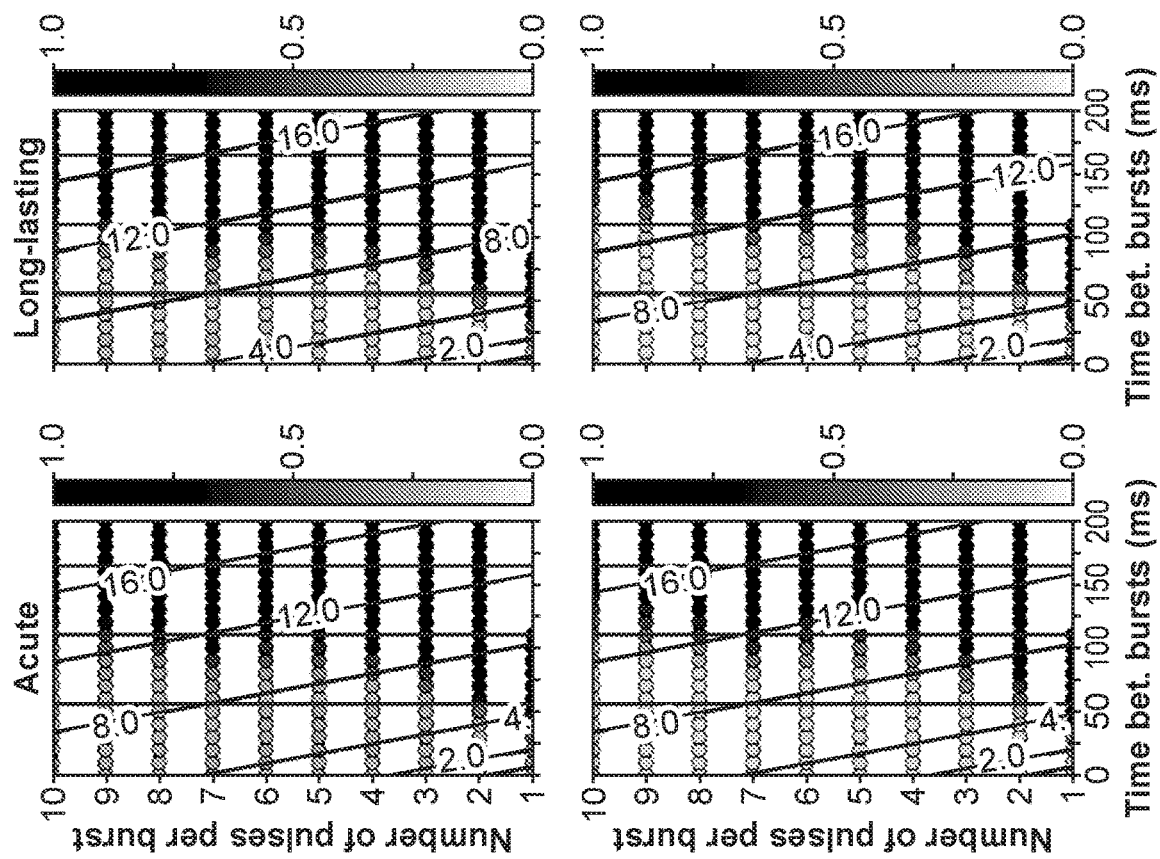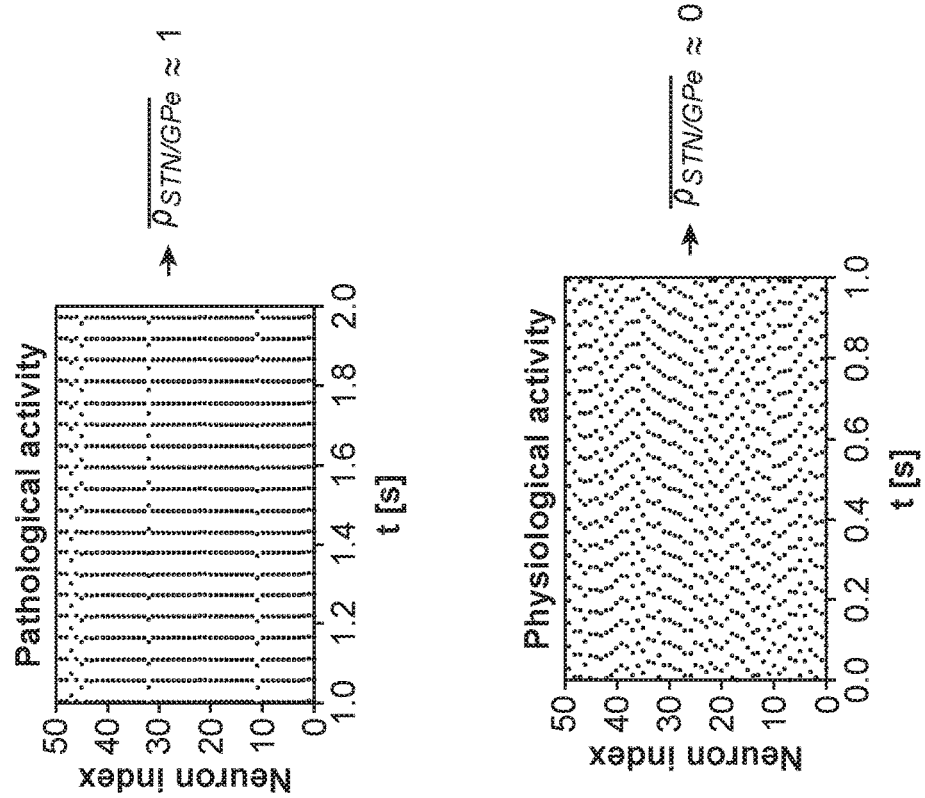
FIG. 8

Improved Technique

Stimulation sites:
- Current is injected at random position

Timing of stimulation bursts:
- Random interburst interval

Mechanism:
* Stimulated neurons are phase-shifted relative to synchronized state
* reduction of synaptic weights during relaxation
* Network learns physiological state

Coordinated Reset

Stimulation sites:
- Position of electrodes fixed

Timing of stimulation bursts:
- Periodic stimulation, frequency adjusted to neuronal firing rates Mechanism:
* Enforcement of unstable N-cluster state
* N-cluster state relaxes to desynchronized state after stimulation is stopped
* Network learns N-cluster state during stimulation

FIG. 9

EFFECTIVE INVASIVE MULTICHANNEL DESYNCHRONIZING STIMULATION

CROSS-REFERENCE TO RELATED APPLICATIONS

This application is a National Stage Entry of PCT/US2019/038545, filed Jun. 21, 2019, which claims the benefit and priority to U.S. Provisional Application No. 62/688,962, filed Jun. 22, 2018, the contents of which are incorporated herein by reference in their entirety.

BACKGROUND

Abnormal synchrony of neurological activity is related to several brain disorders, including Parkinson's disease and epilepsy. Coordinated reset (CR) stimulation can be used to treat abnormal neuronal synchrony. However, CR stimulation involves adjustment of a stimulation frequency (a repetition rate of applied stimulation bursts) to a dominant frequency of an abnormal neuronal synchronized oscillation. If not properly adjusted, inappropriate values of the stimulation frequency can cause resonance-like effects, resulting in strong and unwanted increase of neural synchrony. In addition, CR stimulation involves proper selection of different (adequately spaced) stimulation sites within a tissue volume, which imposes significant calibration demands.

It is against this background that a need arose to develop embodiments of this disclosure.

SUMMARY

Embodiments of this disclosure are directed to an apparatus and method for improved multichannel desynchronizing stimulation. Features of some embodiments include: (1) a time interval between two successive stimulations is not constant (as with CR stimulation), but is drawn randomly according to a probability distribution (e.g., exponentially distributed); and (2) within a spatial range or tissue volume, particular stimulation sites are drawn randomly from one stimulus to another. Embodiments can be applied to deep brain stimulation, as well as other types of invasive (e.g., epicortical) brain stimulation and spinal cord stimulation.

Advantages of some embodiments include: (1) considerably more robust with respect to a detuned stimulation frequency versus a frequency of pathological oscillation; (2) desynchronizes not just one pathological frequency band, but multiple pathological frequency bands—different symptoms (e.g., tremor and akinesia, both related to neural synchrony in different frequency bands) can be treated simultaneously; and (3) precise spacing and calibration of stimulation sites can be omitted, and instead a general spatial range is selected within which stimulation sites are placed—this considerably lowers calibration demands.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 3. Effect of a single stimulation burst on neuronal activity in the synchronized state. Consideration is made of the change of synaptic weights between the synchronized population $P_S$ and the target population $P_T$. A single inhibitory stimulation burst applied at time $t_{stim}$ induces a time shift $\Delta T$ between the spiking activity of the neuronal subpopulations $P_S$ and $P_T$(A). The time shift decays approximately exponentially with coefficient α, which depends on network parameters. The induced time shift between neuronal subpopulations triggers a sequence of synaptic weight changes on synaptic weights between subpopulations, see panel B for notation. Synaptic weight changes induced by a single excitatory stimulation burst of amplitude 62.5 mA are shown in panel C. Data is shown for a small network (50 STN and 50 GPe neurons). Weight changes for different types of excitatory synapses indicated by different curves, see panel B for corresponding colors, are obtained from simulations of a network with synchronous neuronal activity. Excitatory stimulation bursts are administered at random times t∈[0, T] and to randomly chosen subpopulations each containing 12 STN neurons. Shown is the time-dependent mean (dots) and the range of one standard deviation (bars) resulting from a set of 100 simulations.

FIG. 6. Raster plots of neuronal activity during stimulation. Arrivals of stimulation bursts (dark shading) induce time shifts between stimulation neuronal subpopulation and other neurons (1). During stimulation synaptic weights weaken, which yields a slower relaxation of induced time shifts (2).

FIG. 8. Robustness with respect to parameter changes. Acute=right after stimulation, long-lasting=spontaneously evolving on a longer time scale after cessation of stimulation.

FIG. 9. Improved desynchronization technique versus coordinated reset stimulation.

DESCRIPTION

Figure 11:
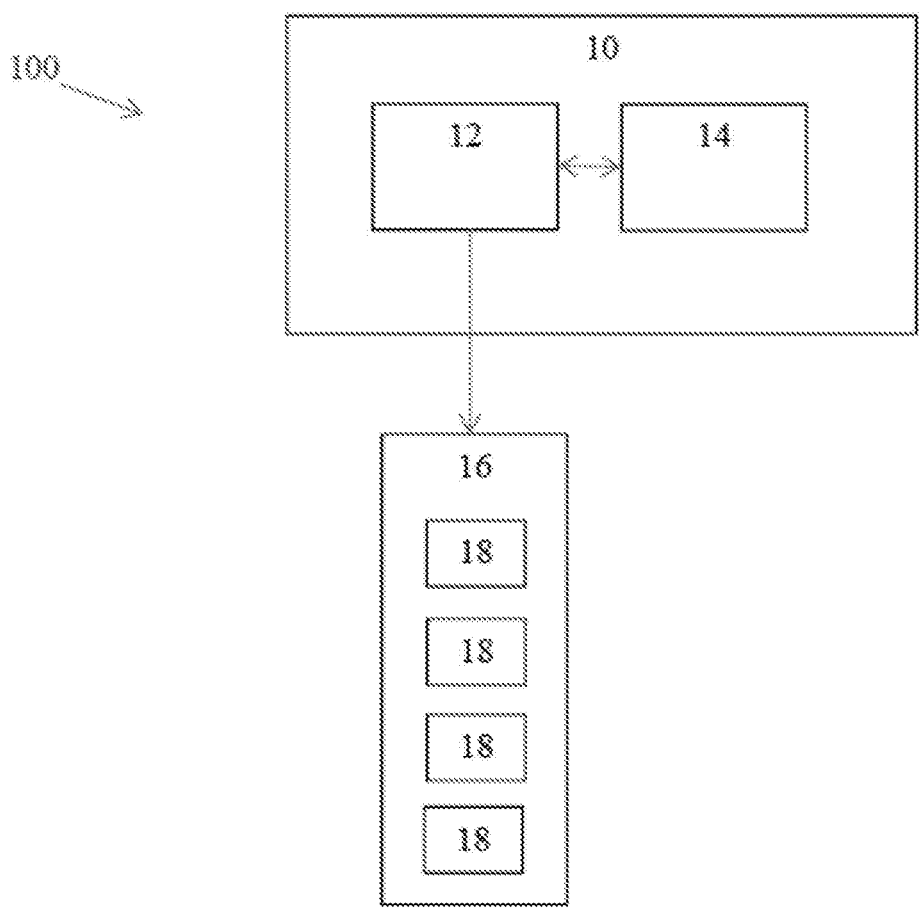
FIG. 11. Schematic illustration of an example of an apparatus for invasive multichannel desynchronizing stimulation.

FIG. 11 schematically illustrates an example of an apparatus 100 for invasive treatment of a patient using multichannel desynchronizing stimulation. The apparatus 100 can be used for the treatment of disorders characterized by abnormal neuronal synchrony. The apparatus 100 includes a pulse generator 10 and at least one electrode 16, which is connected to the pulse generator 10 via a wired or wireless connection.

The pulse generator 10 can be an implantable or semi-implantable component, and includes a signal generator 12 and a controller 14. The signal generator 12 is configured to generate electrical stimuli, such as in the form of successive bursts of electrical current or voltage, which are applied to the patient via the electrode 16. The signal generator 12 can be implemented using signal processing circuits, or using an application-specific integrated circuit. The controller 14 is connected to the signal generator 12 to direct operation of the signal generator 12 and controls the generation of stimuli. The controller 14 also can be integrated in the signal generator 12. The controller 14 can be implemented using a processor and an associated memory storing instructions executable by the processor, or using an application-specific integrated circuit.

The electrode 16 is an implantable component that is configured for placement within a tissue volume of the patient. Depending on the disorder to be treated, the electrode 16 can be implemented as a depth electrode, an epicortical electrode, or a spinal cord electrode. As shown in FIG. 11, the electrode 16 is a multicontact electrode, and includes multiple stimulation contacts 18. The stimulation contacts 18 are configured for placement next to different areas of the tissue volume to allow the different areas to be stimulated in a temporally and spatially controlled pattern. The apparatus 100 shown in FIG. 11 is to be understood as an example implementation, and, more generally, the apparatus 100 can include N electrodes 16, where N is 1 or greater than 1, and can include n stimulation contacts 18 distributed over the N electrodes 16 to deliver n-channel stimulation, where n is 2 or greater than 2, such as 3, 4, 5, 6, 7, 8, 9, 10, and so forth.

The apparatus 100 can be operated to apply a multichannel desynchronizing stimulation pattern to the patient. In particular, the controller 14 can direct the signal generator 12 to apply a stimulation pattern that is characterized by two aspects: (1) a temporal aspect associated with stimulation times when successive stimuli are applied; and (2) a spatial aspect associated with which set of the stimulation contacts 18 is selected to apply a stimulus for each successive stimulation time.

Stimulation Times

Figure 12:
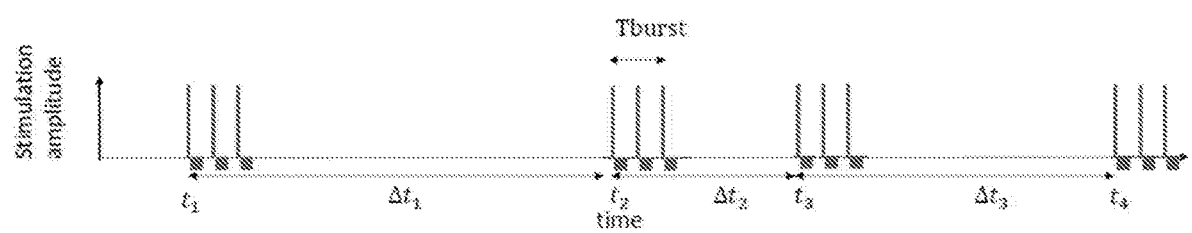
FIG. 12. Stimulation at random inter-stimulation times.

FIG. 12 illustrates an example of a sequence of stimuli. As shown, each stimulus is a stimulation burst including multiple pulses and having a duration $T_{burst}$. Although three pulses are shown per stimulation burst, more generally each stimulation burst can include 1 pulse or more than 1 pulse, such as 2, 3, 4, 5, 6, or more pulses. Furthermore, individual pulses may have shapes that differ from those shown in FIG. 12. Onset stimulation times of the successive stimulation bursts are $t_1$, $t_2$, $t_3$, $t_4$, and so forth, and inter-stimulation times, namely a time difference between successive onset stimulation times, are $\Delta t_i = t_{i+1} - t_i$.

In some embodiments, the controller 14 directs the application of a stimulation pattern in which inter-stimulation times across the n stimulation contacts 18 (or across all n channels) are time-varying and are selected or drawn according to a common random or stochastic process. Specifically, inter-stimulation times $\Delta t_i$ are selected or drawn from, or according to, a probability distribution associated with the random process. The probability distribution is desirably bounded from below by a lower threshold of the stimulus duration $T_{burst}$, such that $\Delta t_i$ does not fall below the stimulus duration $T_{burst}$. In such manner, by drawing inter-stimulation times $\Delta t_i$ according to the common random process with the lower threshold of $T_{burst}$, successive stimuli are applied with random inter-stimulation times $\Delta t_i$, but where the successive stimuli are non-coincident or non-overlapping, as coincident/overlapping stimulus onsets can be counterproductive towards desynchronizing a pathological oscillation. The probability distribution is also desirably characterized by a lack of a pronounced peak, where such a lack is conducive towards desynchronization, and where a metric is a coefficient of variation (CV) as specified by a ratio of a standard deviation of the probability distribution (namely, a variance of inter-stimulation times $\Delta t_i$ according to the probability distribution) over the mean of the probability distribution (namely, a mean inter-stimulation time $\Delta t_i$). In some embodiments, the CV can be in a range of about 0.001 to about 100, about 0.01 to about 20, about 0.01 to about 10, or about 0.1 to about 10. Suitable probability distributions include an exponential distribution and a log-normal distribution, with finite probabilities for $\Delta t_i > T_{burst}$.

Instead of a random process, time-varying inter-stimulation times $\Delta t_i$ can be drawn or selected according to a deterministic process or a combined deterministic-random process lacking a pronounced periodicity.

Stimulation Contacts

In some embodiments, the controller 14 directs the application of a stimulation pattern in which, for each onset stimulation time, a single one of the n stimulation contacts 18 is selected or drawn according to a random process. Specifically, a single one of the n stimulation contacts 18 is selected or drawn from, or according to, a probability distribution associated with the random process. Suitable probability distributions include a uniform probability distribution such that each stimulation contact 18 has an equal probability of being selected for each onset stimulation time. Instead of a random process, a stimulation contact 18 can be drawn or selected according to a deterministic process or a combined deterministic-random process. Through successively selected stimulation contacts 18, a sequence of stimuli is applied through the stimulation contacts 18 with constant stimulation parameters or time-varying stimulation parameters among the stimuli. Examples of stimulation parameters that can be varied from one stimulus to another include one or more of: (1) a number of pulses per stimulation burst; (2) a shape of pulses; (3) a duration of each individual pulse; (4) an amplitude of pulses; and (5) a time period between successive pulses. Time-varying stimulation parameters can be drawn or selected according to a random process, a deterministic process, or a combined deterministic-random process.

In other embodiments, the controller 14 directs the application of a stimulation pattern in which, for each onset stimulation time, a set of one or more of the n stimulation contacts 18 is selected or drawn as a stimulation contact group according to a random process. Specifically, one or more of the n stimulation contacts 18 is selected or drawn for inclusion in a stimulation contact group from, or according to, a probability distribution associated with the random process. Suitable probability distributions include a uniform probability distribution. Instead of a random process, a stimulation contact group can be drawn or selected according to a deterministic process or a combined deterministic-random process. A number m of stimulation contacts 18 included in a stimulation contact group can be fixed, such as where m≤n or m<n and is a fixed number of 2 or greater than 2, or can be time-varying among successively selected stimulation contact groups, such as where m can vary from 1 up to n or (n−1). In some embodiments, optimal effects can be achieved if at least one stimulation contact 18 is included in more than one stimulation contact group. This causes a variability in a neuronal stimulation pattern, which is favorable for population-wide reduction of abnormally-strong synaptic weights, and in which neurons activated by different stimulation contact groups can unlearn their abnormal synaptic connectivity. Through each selected stimulation contact 18 of a stimulation contact group, a stimulus is applied through the stimulation contact group. A sequence of stimuli that is applied through successively selected stimulation contact groups can have constant stimulation parameters or time-varying stimulation parameters among the stimuli, which can be drawn or selected according to a random process, a deterministic process, or a combined deterministic-random process.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Robust Weight Reduction in Plastic Networks by Random Step Stimulation

Overview

Abnormal synchrony of neurological activity is related to several brain disorders, including Parkinson's disease and epilepsy. Current desynchronization techniques specifically target neuronal activity. Desynchronization is achieved by delivering pulse patterns which either suppress or modulate neuronal activity using deep brain stimulation. This example presents a stimulation technique, Random Step (RS) stimulation, which directly targets the synaptic weight dynamics in plastic neuronal networks. By injecting weak stimulation bursts into a randomly chosen neuronal subpopulation, globally synchronized activity is slightly perturbed. However, the induced perturbation triggers sequences of synaptic weight changes, which cause an overall reduction of excitatory synaptic weights. Subsequent injections of stimulation bursts slowly alter the network connectivity and reliably drive the network towards a state of weak excitatory and strong inhibitory synaptic connections. Ultimately, due to the change in network connectivity, the synchronized state becomes unstable and a transition to a stable state of physiological desynchronized neuronal activity is induced.

Introduction

Synchronization of rhythmic behavior determines various daily routines. Circadian rhythms are synchronized to the daily dark/light cycle dictated by an environment and individuals adjust their periodic behavioral patterns, such as eating, sleeping, and so forth, accordingly. As changes to time zones occur, the dark/light cycle and circadian rhythms desynchronize and individuals can experience jet lag which comes along with several symptoms remaining for several days. However, often synchronization of oscillatory activity is an unwanted side-effect. Examples of abnormal synchrony with wide-ranging consequences can be found in the brain. Several brain disorders such as Parkinson's disease or epilepsy are associated with pathological synchrony of neuronal activity in related brain regions.

The connection between various brain disorders and synchronized neuronal activity has induced extensive research on synchronization and robust desynchronization techniques for coupled nonlinear systems. The basic theoretical understanding of synchronization derives from modeling the synchronization of circadian rhythms using a set of coupled oscillators each described by an intrinsic phase variable. A transition from asynchronous to synchronous oscillations occurs at a critical coupling strength.

As strongly-coupled oscillators naturally tend to synchronize, external stimulation input, for instance, deep brain stimulation, is applied in order to induce a transition from a synchronized to a desynchronized state. Therefore, a deep understanding of the response properties of nonlinear systems is desired in order to design effective stimulation techniques. While the concept of a phase response curve (PRC) governs responses to weak input and can be used to study synchronization properties, strong input can trigger highly nonlinear phenomena such a phase reset. This combination has led to the development of desynchronization techniques such as single-pulse, double-pulse, or coordinated reset (CR) stimulation. In these techniques, stimulation pulses are injected in order to desynchronize oscillatory activity. During single- and double-pulse stimulation, a transition to desynchronization is induced by injecting a strong stimulation pulse at a vulnerable phase. In contrast, appropriate CR stimulation dictates an N cluster state to which neuronal activity adjusts. This is achieved by injecting strong stimulation bursts through N different electrodes, targeting N non-overlapping neuronal subpopulations. As stimulation bursts are administered at the frequency of synchronized neuronal activity, the activity of individual subpopulations synchronizes with the rhythm of injected bursts. If appropriate time shifts between rhythms injected through different electrodes are added, the globally synchronized neuronal population breaks into N intrinsically-synchronized neuronal subpopulations.

A more natural desynchronization approach is available in plastic neuronal networks. As synaptic weights change over time, subtle stimulation patterns modulating the synaptic weight dynamics can lead to a reduction of synaptic weights and thereby drive the system below its critical coupling strength. As the weight dynamics is typically much slower than that of neuronal spiking activity, this leads to long-lasting desynchronization effects, even after the stimulation has stopped. Since the individual purpose of the various coexisting types of synaptic plasticity is still under debate, this example focuses on spike-timing dependent plasticity (STDP). In STDP networks, the precise timing of pre- and post-synaptic spikes determines the synaptic weight changes. Pre-synaptic spikes arrivals shortly before the post-synaptic spike result in long term potentiation of synaptic weights, while the opposite timing yields long-term depression. Both a stable state with low synaptic weights and uncorrelated spiking activity and a stable state with high synaptic weights and strongly correlation activity can coexist. During appropriate stimulation, a change of neuronal activity leads to rewiring of synaptic connections and can thereby cause a transition between coexisting states. Theoretical and computational studies of CR stimulation of certain brain regions and neuronal networks with STDP show that N different subpopulations can effectively decouple during CR stimulation.

Due to promising results from theoretical and computational studies, CR deep brain stimulation can be used as symptomatic treatment movement disorders, such as Parkinson's disease. For efficient treatment, stimulation bursts are delivered at the frequency of synchronized neuronal activity through a small number of implanted electrodes targeting independent neuronal subpopulations in the subthalamic nucleus (STN). The STN is a nucleus in the basal ganglia region, which is primarily responsible for motor control. CR stimulation for symptomatic treatment of Parkinson's disease is constrained in that abnormal neuronal synchrony of STN neurons is observed on distinct frequency bands, each related to a distinct set of symptoms (Parkinsonian tremor at about 5 Hz, bradykinesia and rigidity at about 8-35 Hz). As the stimulation frequency has to be adjusted to one of the synchronized neuronal activity, CR generally cannot be used to treat symptoms related to distinct frequency bands at once. In this example, an improved desynchronizing stimulation technique is presented for plastic networks of coupled oscillators or excitable elements, Random Step (RS) stimulation. It is designed to successively reduce excitatory synaptic weights. As the synaptic weight dynamics is slow compared to that of the neuronal activity, RS stimulation can be applied at much slower stimulation frequencies and thereby overcomes the frequency constraints of CR stimulation. This example demonstrates synaptic weight reduction by RS stimulation in a model network of coupled leaky integrate-and-fire neurons with STDP. The network topology is motivated by detailed computational studies on CR stimulation of basal ganglia region. Those studies considered the STN and a nearby nucleus, the Globus pallidus externus (GPe), providing negative feedback to the STN. The network is prepared in a state of synchronized neuronal activity, which mimics pathological neuronal activity in the STN during Parkinsonian resting tremor and demonstrates weight reduction by RS stimulation. As RS stimulation specifically targets the dynamics of synaptic weights, its efficiency is related to the underlying STDP rules rather than the chosen neuron model or the network topology.

This example therefore derives theoretical constraints on STDP rules for which RS stimulation can be used to reduce excitatory synaptic weights. Finally, this example demonstrates that long-lasting desynchronization by RS stimulation is robust with respect to the stimulation frequency.

Results and Discussion

A. Coexisting Desynchronized and Synchronized States

Figure 1:
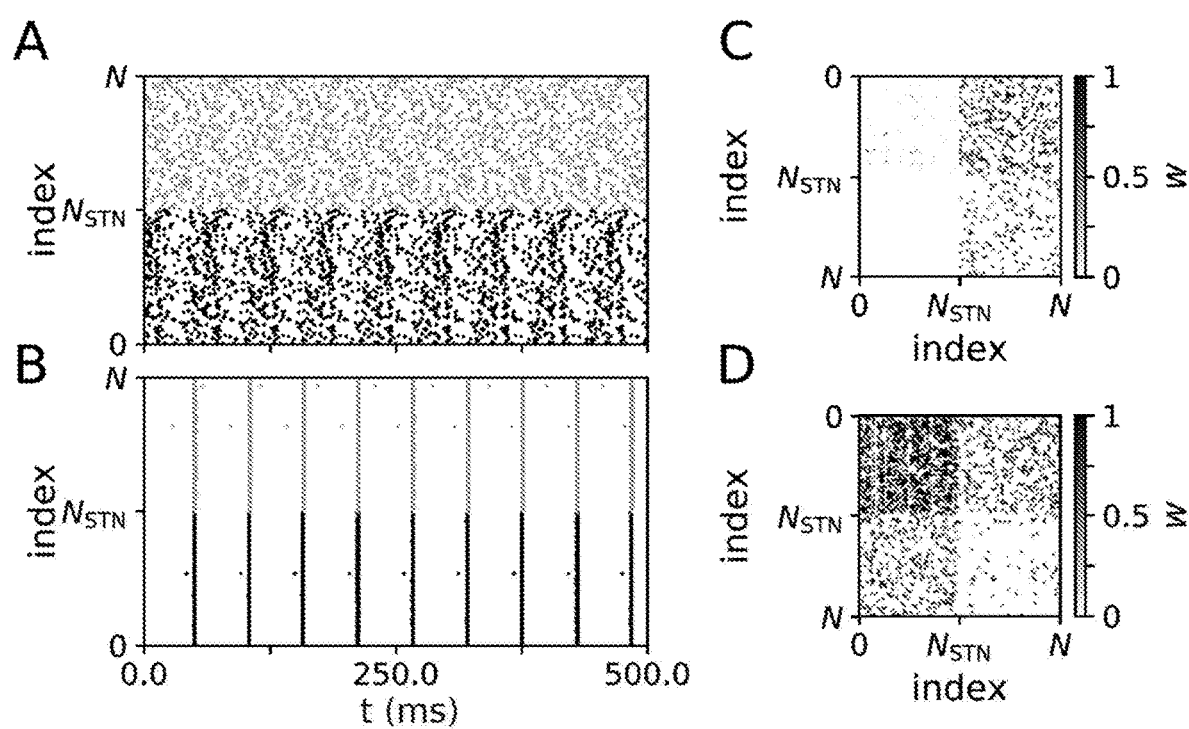
FIG. 1. Coexisting desynchronized and synchronized states in a network of pulse-coupled leaky integrate-and-fire neurons with spike-timing dependent plasticity. Raster plots of desynchronized (A) and synchronized activity (B). Spike times of STN and GPe neurons are marked black and gray, respectively. Panels C and D show snapshots of coupling matrix at t=0 for raster plots shown in panels A and B, respectively. Panels C and D show synaptic weight strengths for excitatory synapses between STN neurons (upper left) and from STN neurons to GPe neurons (left bottom), and weights for inhibitory synapses between GPe neurons (right bottom) and from GPe to STN neurons (upper right).

The strengths of synaptic weights determine the collective dynamics in neuronal networks. Raster plots as well as measures of spike train statistics for different strength of synaptic weights are depicted in FIG. 1. First, consideration is made of the degree of synchronization of a neuronal subpopulation. The latter is quantified by assigning a phase function, $\psi_i(t)$, to the $i^{th}$ neuron's activity and evaluating the Kuramoto order parameter:

$$|\rho_k(t)|e^{j\Psi_k} = \frac{1}{N_k}\sum_{l \in k} e^{j\psi_l(t)}. \tag{1}$$

Here k refers to the neuronal subpopulation, namely k=STN, GPe. The absolute value, $|\rho_k(t)|$, yields the degree of synchronization, with $|\rho_k(t)|=0$ referring to completely asynchronous activity and $|\rho_k(t)|=1$ referring to perfectly synchronized activity. The phase variable $\Psi_k$ is the phase of the mean field of the neuronal population. The phase function $\psi_i(t)$ increase by $2\pi$ at each spike of neuron i and is interpolated linearly in between.

For initial conditions with sufficiently small excitatory synaptic weights, yet strong inhibitory weights, the network approaches a stationary state of desynchronized activity, namely $|\rho_{STN}(t)|\approx 0$, see FIGS. 1A and C. Individual STN neuron exhibits asynchronous spiking activity at about 20 Hz. In contrast, if initial network configuration contains strong excitatory synapses, the network eventually approaches a state with a high degree of synchronization $|\rho_{STN}(t)|\approx 1$. In that state, STN neurons show repetitive synchronous spiking activity of about 20 Hz, see FIGS. 1B and D. The latter state mimics pathological STN activity during akinetic states in patients with Parkinson's disease and therefore represents the initial point for desynchronizing stimulation.

Once STDP is incorporated, synaptic weights evolve over time which causes changes in network connectivity. For appropriately-asymmetric STDP rules, the network approaches a state of desynchronized activity when starting at low initial weights, whereas high initial synaptic weights lead to stable synchronous network activity.

B Random Step (RS) Stimulation

In order to induce a transition from a strongly-synchronized state to a physiological state of desynchronized activity, successive reduction of excitatory weights is proposed. To this end, stimulation bursts are injected to randomly chosen neuronal subpopulations at stimulation times $t_i$. Inter-stimulation times $\Delta t_i = t_{i+1} - t_i$ are drawn from an exponential distribution. Considering non-overlapping stimulation bursts of duration $T_{burst}$, the distribution of inter-stimulation times is given by:

$$p(\Delta t_i) = \Delta^{-1} \exp\left(-\frac{\Delta t_i - T_{burst}}{\Delta}\right) \Theta(\Delta t_i - T_{burst}). \quad (2)$$

Here $\Theta(x)$ is the Heaviside theta function (which is a step function that is 0 for x<0 and is 1 for x≥1) and A determines the time scale between subsequent stimulation burst arrivals. It sets the mean stimulation frequency to $f_{stim}$ of about $(T_{burst}+\Delta)^{-1}$. In the limit of short stimulation bursts $T_{burst}$, which corresponds to a delta pulse stimulation, Eq. (2) ensures that stimulation times are generated by a homogeneous Poisson process with rate $\Delta^{-1}$.

Figure 2:
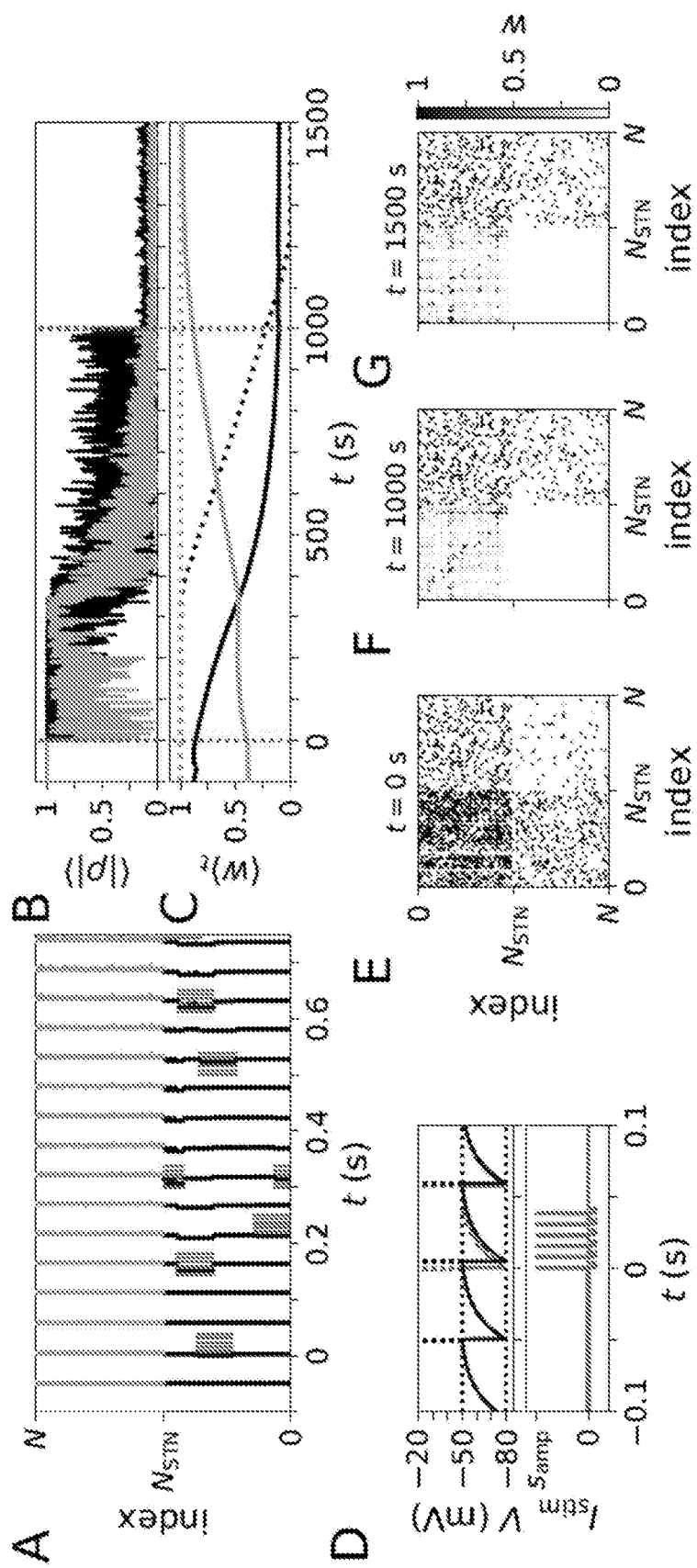
FIG. 2. Effect of Random Step (RS) stimulation on synchronized neuronal activity and synaptic weights. RS stimulation is started at t=0 and applied for a total stimulation time of 1000 s. A: stimulation bursts (marked in dark grey) induce small time shifts between neuronal subpopulations. While the Kuramoto parameter remains finite during stimulation (B), RS causes reliable reduction of excitatory synaptic weights over time (C). In panel C, mean excitatory weights are shown in black and inhibitory weights in gray. Dashed lines mark weights between STN and GPe neurons. D: Effect of RS on spiking activity of a single leaky integrate-and-fire neuron. Dashed horizontal lines mark threshold and reset values for the membrane potential. Dashed vertical lines mark spike times. E-G: snapshots of connectivity matrix before (t=0 s), directly after RS stimulation (t=1000 s), and 500 seconds after stimulation has stopped (1500 s). Connectivity matrices are plotted as in FIG. 1. Stimulation is applied to 70 STN neurons with subsequent indices at once (periodic boundary conditions). Burst amplitude is $s_{amp}=125$ μA/cm$^2$ and mean inter-burst interval $\Delta=50$ ms. 6 charged-balanced stimulation pulses are used per stimulation burst.

Simulation results on desynchronization by RS of a network of leaky integrate-and-fire neurons with STDP are shown in FIG. 2. While small-amplitude stimulation bursts hardly affect neuronal spiking activity, see FIG. 2A,D, they cause a reliable reduction of excitatory synaptic weights during the stimulation time (FIG. 2B, E-G). This drives the network below its critical coupling strength. Finally, the network approaches a stable state of weak synaptic coupling which stabilizes desynchronized neuronal activity.

C. Successive Reduction of Excitatory Synaptic Weights During Stimulation

In contrast to other stimulation techniques, such as CR, RS stimulation aims on a successive reduction of excitatory synaptic weights rather than a direct modulation of neuronal activity. This is achieved by injecting weak stimulation bursts into randomly chosen neuronal subpopulations. Each stimulation burst arrival, induces a time shift $\Delta T$ between the stimulated target population $P_T$ and the neurons remaining in the synchronized state $P_S$, see FIG. 3A. For small target populations and small time shifts, $\Delta T$ decays approximately exponentially over time and the spike timings of the synchronized population $P_S$ remain unaffected. The induced time shift between neuronal subpopulations triggers a sequence of weight changes for all synaptic connections between the subpopulations $P_T$ and $P_S$. The resulting total weight change depends on the STDP rule underlying synaptic weight updates. It can be estimated by following the approach developed for two bidirectionally-coupled oscillators. In the absence of synaptic transmission delays, an excitatory stimulation burst, namely a stimulation burst leading to $\Delta T<0$, induces positive weight updates for outgoing excitatory synaptic connections $P_T \to P_S$, while weight updates for ingoing synaptic connections are negative. An inhibitory stimulation, $\Delta T>0$, acts in the opposite way. The sequence of weight changes induced by a single stimulation burst injected to a network of synchronized leaky integrate-and-fire neurons is shown in FIG. 3C. Results are averaged over different stimulation times and target populations. In the presence of synaptic transmission delays, the resulting weight changes become more complicated. Since inter-burst intervals are drawn from an exponential distribution, Eq. (2), stimulation times $t_{stim}$ become effectively uniformly distributed with respect to the period of the synchronized state. Finally, a reduction of all synaptic weights is achieved by applying a sequence of stimulation bursts each to a randomly chosen neuronal subpopulation.

In order to reliably reduce the total excitatory weight, the sum of the changes of in- and outgoing weights should be negative. In case of negligible synaptic transmission delays, the total weight change on ingoing synapses during a single period of the synchronized neuronal subpopulation is given by $<w_{ST}> = \Delta w(\text{sgn}(\Delta t)(-T+\alpha^n|\Delta t|)) + \Delta w(\alpha^n \Delta t)$. For outgoing synapses the corresponding weight change reads $<w_{TS}> = \Delta w(\text{sgn}(T-\alpha^n|\Delta t|)) + \Delta w(-\alpha^n \Delta t)$. Here n refers to the time after the last perfectly synchronous oscillation in units of inter-spike intervals T of the synchronous state, sgn refers to the sign of $\Delta t$ and distinguishes between excitatory and inhibitory stimulation bursts, and $\alpha$ sets the decay time of the induced time shift and relates the weight changes, which are exclusively determined by the STDP rule, to the neuronal and network dynamics. If T is large compared to the characteristic decay times in the STDP rule, which is typically in the range of about 20 ms, the total weight change during the nth period after stimulation is approximately given by $\Delta w(\alpha^n \Delta t) + \Delta w(-\alpha^n \Delta t)$. It is therefore determined by the asymmetry in the STDP rule for time differences $\alpha^n \Delta t$ between post- and pre-synaptic spikes. If synaptic depression dominates over potentiation, weights can be effectively reduced by inducing corresponding time steps. Additional constrains such as hard bounds, or other synaptic plasticity rules, lead to additional weight changes and can be considered separately. Implementations of hard or soft bounds support weight reduction in the synchronized state as positive individual weight changes are reduced.

D. Efficiency of RS Stimulation

Weight reduction is most effective if the induced time shift $\Delta t$ decays over a depression dominated region with well-pronounced asymmetry in a depression-dominated STDP rule, namely $\Delta w(\alpha^n \Delta t) + \Delta w(-\alpha^n \Delta t) < 0$ for several n. Furthermore, stimulating regions with a large number of ingoing or outgoing connections with excitatory or inhibitory stimulations, respectively, improve weight reduction.

The time shift is determined by the precise timing of the stimulation, the shape of the stimulation burst, and the stimulation amplitude. For weak stimulation amplitudes, $\Delta t$ can be approximated using the phase response curve (PRC) of the neuron model. As PRCs of integrator and resonator neurons, namely repetitive spiking due to passing of Saddle-node and Andronov Hopf bifurcation, respectively, have qualitatively different shapes, the shape of the applied stimulation burst should be adjusted accordingly. However, in contrast to CR stimulation, the presented technique does not rely on stimulation bursts that cause actual resets of the neuronal subpopulation. Indeed, any burst shape causing appropriate time shifts can be used.

Figure 4A:
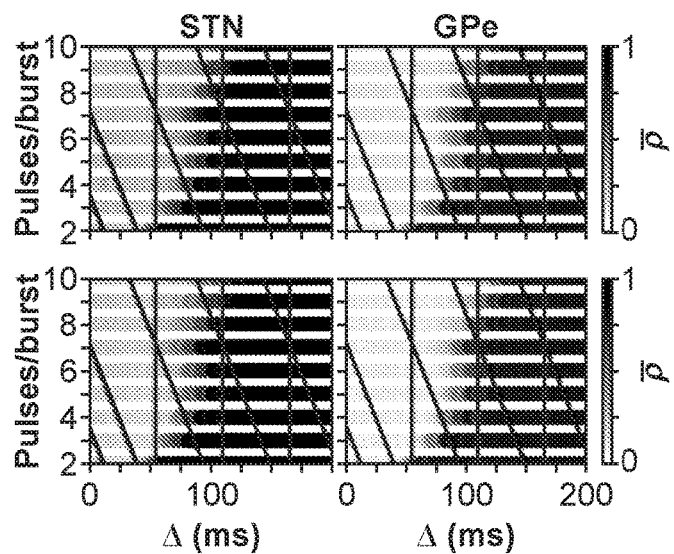
FIG. 4. Average effect of RS stimulation as function of Δ (see Eq. (2)) and pulses per stimulation burst. Time-averaged Kuramoto order parameter (A) and averaged synaptic weights (B) as function of mean inter-burst interval and numbers of pulses per burst obtained from simulations. $10^5$ pulses of RS stimulation were delivered in bursts with respective numbers of pulses to 12 STN neurons at a time. Actuate effects (top) of RS stimulation right after stimulation. Long-lasting effects (bottom) obtained 100 STDP time scales, $\Delta^{-1}=1$ s, after stimulation has stopped. Gray vertical lines mark inter-burst intervals that are multiples of the oscillation period of synchronized neuronal activity, T of about 55 ms. Black lines indicate ratios of mean stimulation frequency (inverse average time for four stimulation bursts) relative to neuronal oscillation frequency, marked ratios are [1/2, 1/4, 1/8, 1/12, 1/16] from lower left to upper bottom. Simulations were done for small networks comparable to those used in FIG. 3. Results are averaged over four network realizations, each stimulated with four different realizations of RS stimulation.
Figure 4B:
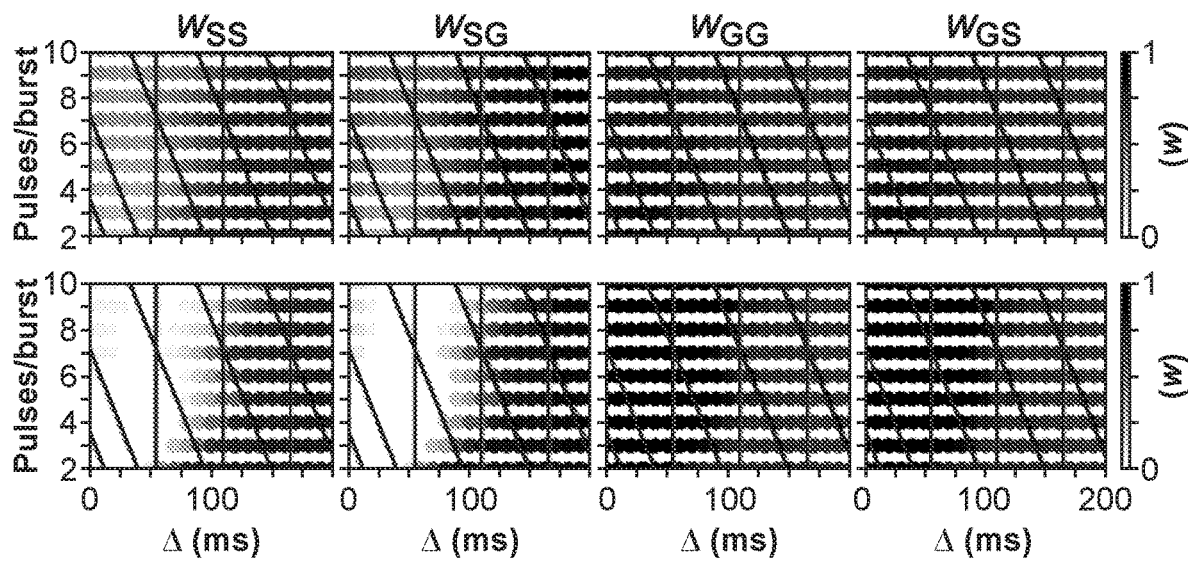

E. RS Stimulation-Induced Weight Reduction is Robust with Respect to Stimulation Frequency A constraint of other CR stimulation is that the stimulation frequency is specified to match the firing frequency of the synchronized neuronal activity. In contrast, RS stimulation frequency is not restricted to a particular stimulation frequency, see FIG. 4. This is because RS stimulation relies on the decay of the induced time shifts between neuronal subpopulation and does not rely on the dictation of an N-cluster state as in other CR stimulation. As a consequence the stimulation frequency is just restricted by the time scale at which the triggered synaptic weight changes decay back to their stationary values. This time scale is determined by the time scale $\delta^{-1}$ of synaptic weight changes due to STDP. This time scale is usually much slower than that of the neuronal spiking activity; in the case here, $\delta^{-1}=1$ s. Rewiring of synaptic connections mainly occurs several periods after the actual stimulation, see FIG. 3C, which makes fast stimulation burst delivery unnecessary. This allows for lower stimulation frequencies than those typically used for CR stimulation—stimulation bursts are typically delivered at about 20 Hz for CR stimulation targeting beta band activity. Details on the frequency dependence performance of RS stimulation are shown in FIG. 4. While efficient CR stimulation is restricted to a frequency ratio of the order of one, weight reduction can be achieved at up to ten times slower stimulation frequencies if RS stimulation is used.

Conclusion

This example presents desynchronization via RS stimulation, which specifically targets the synaptic weight dynamics in plastic neuronal networks with depression dominated STDP rules. While other desynchronization techniques aim on manipulating neuronal activity in order to achieve desynchronization, RS stimulation does not aim at affecting neuronal activity in the first place. Instead, RS stimulation takes advantage of asymmetries in the STDP rule and successively reduces excitatory synaptic weights. This drives the network below its critical coupling strengths. Ultimately, neuronal activity changes in response to these induced changes of network connectivity.

Targeting synaptic weight dynamics entails several advantages over other desynchronization approaches: first it allows for slower stimulation frequency and thereby significantly reduces the total injected current. The latter may reduce the risk of unwanted side effects in possible clinical applications. Second, fine-tuning of the stimulation frequency can be omitted. According to the simulation results, RS stimulation at mean frequencies in the range of about 0.1-about 1 firing rates performs similarly.

The efficient performance of RS stimulation can be impacted by the STDP rule determining synaptic weight updates. RS stimulation specifies depression-dominated additive Hebbian STDP rule with well-pronounced asymmetry. The latter is used in computational models of neuronal networks.

Given a suitable STDP rule, the shape of stimulation pulses, the length of a burst, and the stimulation amplitude control the statistics of induced time shifts between neuronal subpopulations. RS stimulation performance is enhanced if the induced time shifts result in predominantly negative weight updates. In depression-dominated STDP rules, this is usually the case for time shifts that are on the order of the decay time of synaptic weight updates, namely on the order of about 10-20 ms.

Models

Models used in this example are networks of pulse-coupled leaky integrate-and-fire neurons operating in tonic firing regime.

Example 2

Figure 5:
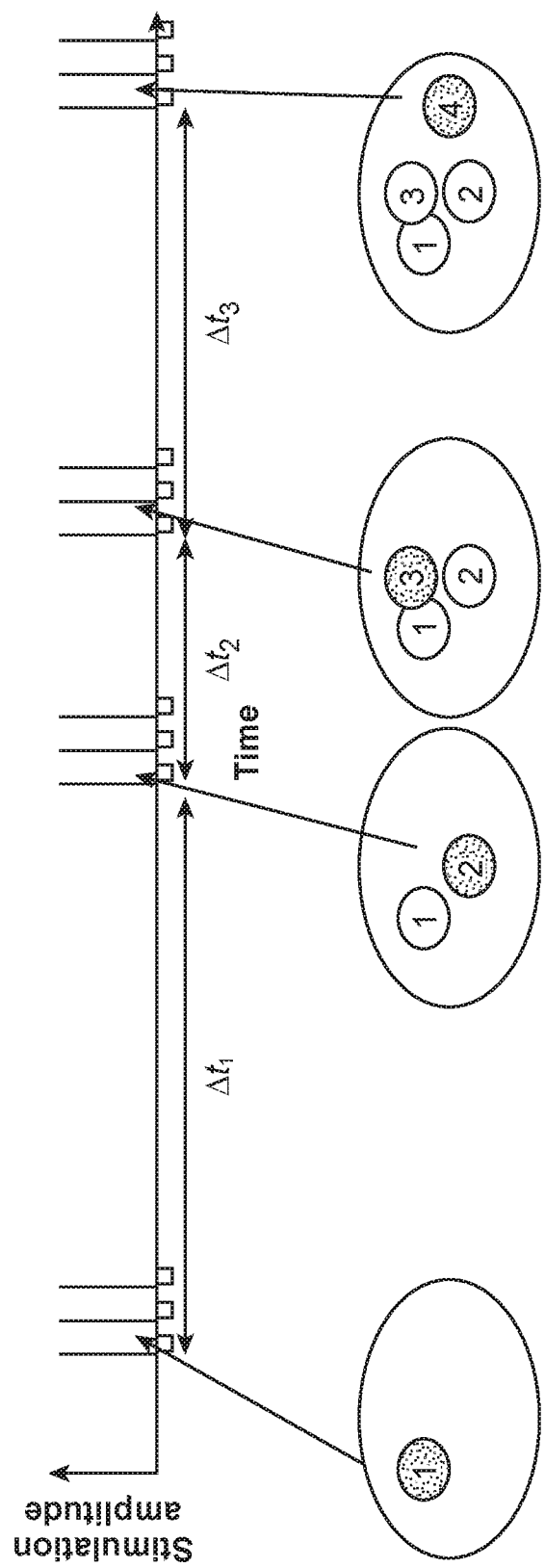
FIG. 5. Stimulation at random inter-stimulation times and random stimulation sites.

FIG. 5 shows stimulation applied in the form of stimulation bursts at inter-stimulation times $\Delta t_i$ drawn from an exponential probability distribution, and where a stimulation burst is applied at a randomly chosen stimulation contact (or stimulation site), and where each stimulation contact is chosen with equal probability.

FIG. 6 shows that stimulated subpopulations are phase-shifted against a synchronized state, and, during a relaxation process, synaptic plasticity leads on average to a decrease of synaptic weights.

Figure 7:
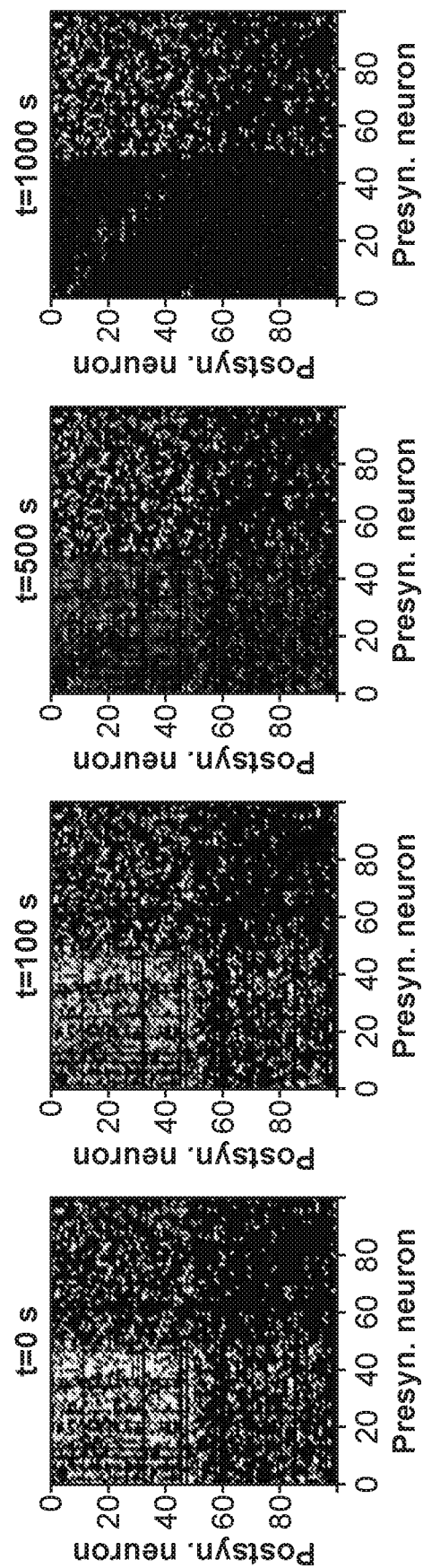
FIG. 7. Time sequence of coupling matrix before (t=0) and during stimulation. Strong synaptic connections are indicated by light shading and weak ones by dark shading. Excitatory weights (left part of coupling matrix) reliably reduce over time and the network learns a physiological state of weak excitatory weights. The latter supports desynchronized neuronal activity.

FIG. 7 shows that a network learns a physiological state.

FIG. 8 shows that desynchronization is robust with respect to parameter changes: number of pulses per stimulation burst, and inter-burst interval (IBI).

FIG. 9 compares features of the improved desynchronization technique with coordinated reset stimulation.

Example 3

Figure 10:
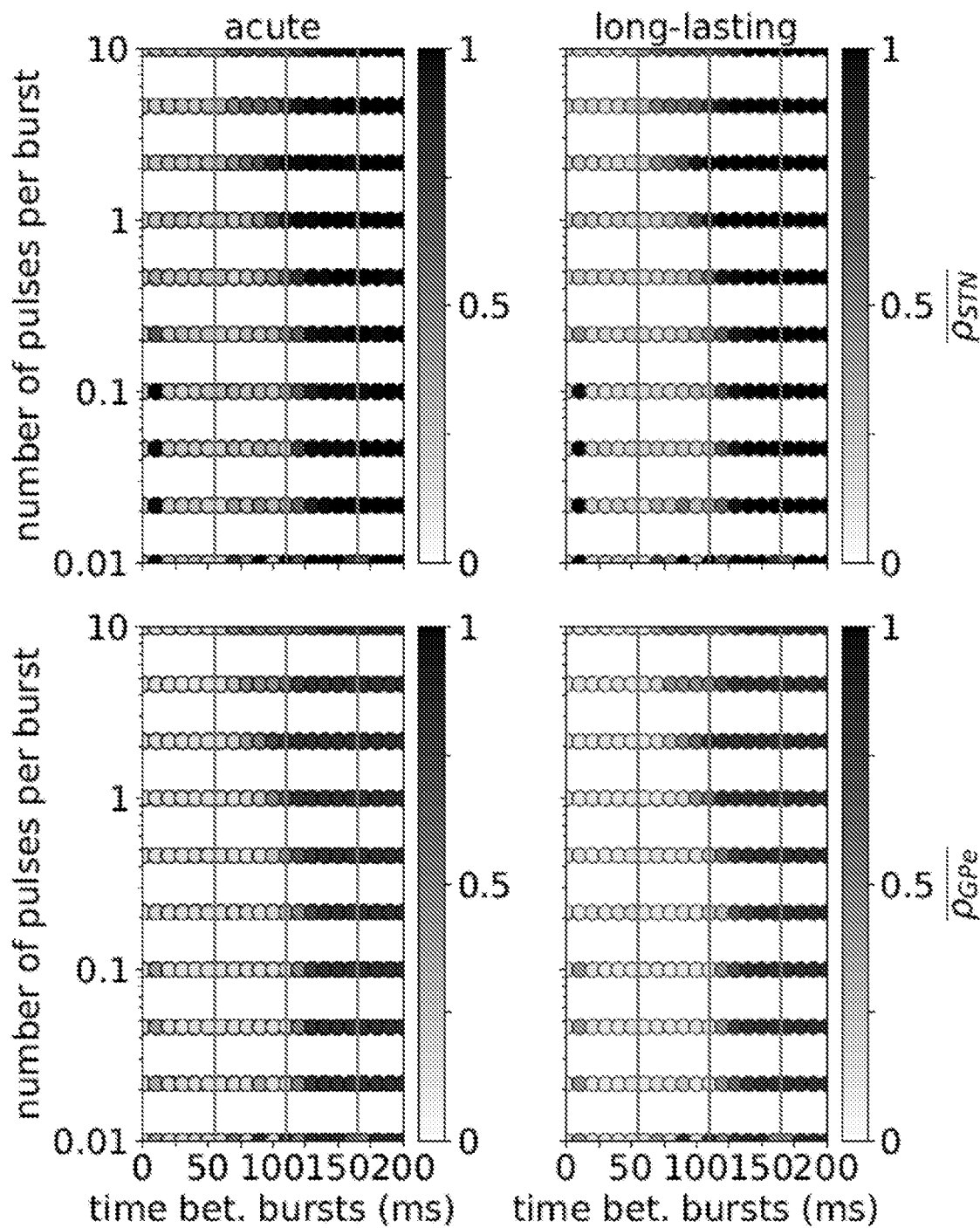
FIG. 10. Kuramoto order parameter characterizing degree of synchronization for STN (top) and GPe (bottom). $10^5$ stimulation pulses were delivered in bursts. Left column shows values right after stimulation (acute). Right column shows Kuramoto order parameter 100 STDP time scales after cessation of stimulation (long lasting).

FIG. 10 shows effectiveness of desynchronization using log-normal distributed inter-stimulation times with respect to parameter changes. Log-normal distributions are parameterized by their coefficient of variation and the mean time between bursts (mean inter-stimulation time minus burst duration).

EXAMPLE EMBODIMENTS

First Aspect

In some embodiments, an apparatus for treatment of a patient using multichannel desynchronizing stimulation includes: (1) n stimulation contacts, with n being 2 or greater; (2) a signal generator connected to the n stimulation contacts; and (3) a controller connected to the signal generator to direct operation of the signal generator, wherein the controller is configured to direct the signal generator to apply a sequence of stimuli through the n stimulation contacts, such that inter-stimulation times in the sequence are time-varying, and successive stimuli in the sequence are non-overlapping in time.

In some embodiments, the controller is configured to select the inter-stimulation times for the n stimulation contacts according to a common random process.

In some embodiments, the controller is configured to select the inter-stimulation times according to a probability distribution associated with the random process.

In some embodiments, each stimulus in the sequence has a stimulus duration, and the probability distribution is bounded by a lower threshold of the stimulus duration.

In some embodiments, the probability distribution is characterized by a coefficient of variation in a range of about 0.001 to about 100.

In some embodiments, the probability distribution is characterized by a coefficient of variation in a range of about 0.01 to about 20.

In some embodiments, the probability distribution is an exponential distribution.

In some embodiments, the controller is configured to select the inter-stimulation times for the n stimulation contacts according to a deterministic process or a combined random-deterministic process.

In some embodiments, the controller is configured to select, for each stimulus in the sequence, a single one of the n stimulation contacts, such that the stimulus is applied through the selected one of the n stimulation contacts.

In some embodiments, the controller is configured to select successive stimulation contacts from the n stimulation contacts according to a random process.

In some embodiments, the controller is configured to select, for each stimulus in the sequence, a set of m stimulation contacts from the n stimulation contacts as a stimulation contact group, such that the stimulus is applied through each of the set of m stimulation contacts of the stimulation contact group.

In some embodiments, m≤n.

In some embodiments, m is 2 or greater.

Second Aspect

In some embodiments, a method for multichannel desynchronizing stimulation includes: (1) providing n stimulation contacts, with n being 2 or greater; and (2) applying a sequence of stimuli through the n stimulation contacts, such that inter-stimulation times in the sequence are time-varying, and successive stimuli in the sequence are non-overlapping in time.

In some embodiments, applying the sequence of stimuli includes selecting the inter-stimulation times for the n stimulation contacts according to a probability distribution associated with a common random process for the n stimulation contacts.

In some embodiments, each stimulus in the sequence has a stimulus duration, and the probability distribution is bounded by a lower threshold of the stimulus duration.

In some embodiments, the probability distribution is characterized by a coefficient of variation in a range of about 0.01 to about 20.

In some embodiments, applying the sequence of stimuli includes selecting, for each stimulus in the sequence, a single one of the n stimulation contacts, such that the stimulus is applied through the selected one of the n stimulation contacts.

In some embodiments, applying the sequence of stimuli includes selecting, for each stimulus in the sequence, a set of m stimulation contacts from the n stimulation contacts as a stimulation contact group, such that the stimulus is applied through each of the set of m stimulation contacts of the stimulation contact group.

In some embodiments, m≤n.

In some embodiments, m is 2 or greater.

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common characteristics.

As used herein, the terms "connect," "connected," and "connection" refer to an operational coupling or linking. Connected objects can be directly coupled to one another or can be indirectly coupled to one another, such as via one or more other objects.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

Some embodiments of this disclosure relate to a non-transitory computer-readable storage medium having or storing computer code or instructions thereon for performing various computer-implemented operations. The term "computer-readable storage medium" is used to include any medium that is capable of storing or encoding a sequence of instructions or computer code for performing the operations, methodologies, and techniques described herein. The media and computer code may be those specially designed and constructed for the purposes of the embodiments of this disclosure, or may be of the kind available to those having skill in the computer software arts. Examples of computer-readable storage media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs), and ready-only memory (ROM) and random-access memory (RAM) devices. Examples of computer code include machine code, such as produced by a compiler, and files containing higher-level code that are executed by a processor using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote computer (e.g., a server computing device) to a requesting computer (e.g., a client computing device or a different server computing device) via a transmission channel. Another embodiment of the disclosure may be implemented in hardwired circuitry in place of, or in combination with, processor-executable software instructions.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations are not a limitation of this disclosure.

What is claimed is:

1. An apparatus for treatment of a patient using multichannel desynchronizing stimulation, comprising:
n stimulation contacts, with n being 3 or greater;
a signal generator connected to the n stimulation contacts; and
a controller connected to the signal generator to direct operation of the signal generator,
wherein the controller is configured to direct the signal generator to apply a sequence of a plurality of stimuli through the n stimulation contacts, such that inter-stimulation times between each successive individual stimulus of the plurality of stimuli through the n stimulation contacts in the sequence are time-varying, and successive stimuli in the sequence are non-overlapping in time,
wherein each stimulus comprises two or more bursts of multiple pulses respectively and simultaneously applied at two or more of the n stimulation contacts, and
wherein each stimulus has a duration defined by an onset of the burst to the end of the multiple pulses of the each stimulus, and
wherein the inter-stimulation times are defined by times between successive onsets of the bursts of the plurality of stimuli in the sequence, and
wherein the controller is configured to select the inter-stimulation times for the n stimulation contacts according to a common random process, and
wherein the controller is configured to select the inter-stimulation times according to a probability distribution associated with the random process, and
wherein the probability distribution is bounded by a lower threshold of the stimulus duration.

2. The apparatus of claim 1, wherein the controller is configured to select, for each stimulus in the sequence, a set of m stimulation contacts from the n stimulation contacts as a stimulation contact group, such that the stimulus is applied through each of the set of m stimulation contacts of the stimulation contact group.

3. The apparatus of claim 2, wherein m≤n.

4. The apparatus of claim 2, wherein m is 2 or greater.

5. An apparatus for treatment of a patient using multichannel desynchronizing stimulation, comprising:
n stimulation contacts, with n being 2 or greater;
a signal generator connected to the n stimulation contacts; and
a controller connected to the signal generator to direct operation of the signal generator,
wherein the controller is configured to direct the signal generator to apply a sequence of a plurality of stimuli through the n stimulation contacts, such that inter-stimulation times between each successive individual stimulus of the plurality of stimuli through the n stimulation contacts in the sequence are time-varying, and successive stimuli in the sequence are non-overlapping in time,
wherein each stimulus comprises a burst of multiple pulses applied at a single one of the n stimulation contacts, wherein a first stimulus in the sequence is applied at a first single one of the n stimulation contacts and not to any other of the n stimulation contacts, and a second successive stimulus in the sequence is applied at a second single one of the n stimulation contacts and not to any other of the n stimulation contacts, and
wherein each stimulus has a duration defined by an onset of the burst to the end of the multiple pulses applied at the single one of the n stimulation contacts, and
wherein the inter-stimulation times are defined by times between successive onsets of the bursts of the plurality of stimuli in the sequence, and
wherein the controller is configured to select the inter-stimulation times for the n stimulation contacts according to a common random process, and
wherein the controller is configured to select the inter-stimulation times according to a probability distribution associated with the random process, and
wherein the probability distribution is bounded by a lower threshold of the stimulus duration.

6. The apparatus of claim 5, wherein the probability distribution is characterized by a coefficient of variation in a range of about 0.001 to about 100.

7. The apparatus of claim 5, wherein the probability distribution is characterized by a coefficient of variation in a range of about 0.01 to about 20.

8. The apparatus of claim 5, wherein the probability distribution is an exponential distribution.

9. The apparatus of claim 5, wherein the controller is configured to select the inter-stimulation times for the n stimulation contacts according to a deterministic process or a combined random-deterministic process.

10. The apparatus of claim 5, wherein the controller is configured to select, for each stimulus in the sequence, the single one of the n stimulation contacts, such that the stimulus is applied through the selected one of the n stimulation contacts.

11. The apparatus of claim 10, wherein the controller is configured to select successive stimulation contacts from the n stimulation contacts according to a random process.

12. The apparatus of claim 5, wherein the second single one of the n stimulation contacts is different than the first single one of the n stimulation contacts.

13. A method for multichannel desynchronizing stimulation, comprising:
providing n stimulation contacts, with n being 2 or greater; and
applying a sequence of a plurality of stimuli through the n stimulation contacts, such that inter-stimulation times between each successive individual stimulus of the plurality of stimuli through the n stimulation contacts in the sequence are time-varying, and successive stimuli in the sequence are non-overlapping in time,
wherein each stimulus comprises a burst of multiple pulses applied at a single one or more of the n stimulation contacts, wherein a first stimulus in the sequence is applied at a first single one of the n stimulation contacts and not to any other of the n stimulation contacts, and a second successive stimulus in the sequence is applied at a second single one of the n stimulation contacts and not to any other of the n stimulation contacts, and
wherein each stimulus has a duration defined by an onset of the burst to the end of the one or more pulses of the each stimulus, and
wherein the inter-stimulation times are defined by times between successive onsets of the bursts of the plurality of stimuli in the sequence, and
wherein applying the sequence of stimuli includes selecting the inter-stimulation times for the n stimulation contacts according to a probability distribution associated with a common random process for the n stimulation contacts, and wherein the probability distribution is bounded by a lower threshold of the stimulus duration.

14. The method of claim 13, wherein the probability distribution is characterized by a coefficient of variation in a range of about 0.01 to about 20.

15. The method of claim 13, wherein applying the sequence of stimuli includes selecting, for each stimulus in the sequence, a single one of the n stimulation contacts, such that the stimulus is applied through the selected one of the n stimulation contacts.

16. The method of claim 13, wherein applying the sequence of stimuli includes selecting, for each stimulus in the sequence, a set of m stimulation contacts from the n stimulation contacts as a stimulation contact group, such that the stimulus is applied through each of the set of m stimulation contacts of the stimulation contact group.

17. The method of claim 16, wherein m≤n and m is 2 or greater.

18. The method of claim 13, wherein the second single one of the n stimulation contacts is different than the first single one of the n stimulation contacts.

\* \* \* \* \*